2,845,341

PROCESS FOR PURIFYING REFRACTORY METAL SUBCHLORIDE COMPOSITIONS

Edwin Randolph Marshall and Leon Allen Monson, Wilmington, Del., assignors to E. I. du Pont de Nemours & Company, Wilmington, Del., a corporation of Delaware No Drawing. Application April 15, 1955
Serial No. 501,734

12 Claims. (Cl. 75—1)

This invention relates to the purification of molten salt compositions containing a metal sub-halide useful as an intermediate in the preparation of a metal from the fourth group of the periodic table. More particularly, it relates to novel methods for refining molten titanium subchloride salt compositions useful in preparing relatively pure forms of titanium metal.

The normally solid subchlorides of titanium, e. g., titanium trichloride and dichloride, or their mixtures, comprise useful intermediates for preparing titanium metal through reduction of such subchlorides at elevated temperature. In the reduction, a molten salt composition containing the subchlorides and at least one halide from the class consisting of the chlorides of the alkali (sodium, potassium, lithium) and alkaline earth metals (magnesium, barium, calcium, strontium) is usually employed. The value of the metal product will depend to a great extent upon the purity of the salt composition used in its preparation.

Because titanium has a high affinity for deleterious impurities, extreme care must be exercised during its production to prevent its contamination. Oxygen and nitrogen are especially deleterious, their presence arising as a result of atmospheric contamination. The metal is also subject to contamination from metals and salts of metals which are more easily reduced than titanium metal, especially such base metal contaminants as iron, copper, manganese, etc. Hence, great emphasis is placed upon careful process manipulation to prevent their introduction or accumulation in the metal producing system.

The procedures and precautions taken are of little value if the raw materials used in producing the metal are undesirably contaminated by these impurities which may be present therein in soluble or insoluble form.

It is among the objects of this invention to overcome the above and other disadvantages of prior metal producing operations, and especially those in which salt compositions of the type referred to are utilized as an intermediate. It is also an object of the invention to provide novel and effective methods for attaining these objects. A particular object is to provide a purified or refined type of molten salt composition from which, prior to use, dissolved and dispersed impurities originally present therein have been removed. A further object is to provide a novel method for purifying such intermediate so that a suitable, relatively pure type of raw material will be available to insure production of a satisfactorily pure form of metal product in the reduction. An additional, specific object is to provide a simple, economical and efficient method for purifying molten salt compositions, especially those containing titanium subchlorides associated with at least one chloride of an alkali and alkaline earth metal from which ultimate recovery can be readily effected of a pure form type of titanium metal. Other objects and advantages of the invention will be apparent from the ensuing description thereof.

These and other objects are attained in this invention which comprises purifying an impurity contaminated molten salt composition containing a normally solid fourth group metal subhalide, especially a subchloride which comprises reducing the average valence of said fourth group metal in the molten salt to convert the impurity contaminants present to removable state, and thereafter separating the purified molten salt from the resulting insolubilized impurity.

In more specific and preferred embodiment the invention comprises purifying an impure molten salt composition comprising a mixture of titanium subchlorides with sodium chloride, which comprises reducing the average valence of the titanium in said molten salt to substantially that at which impurities present are rendered insoluble and precipitated therein, and removing the insolubilized material from the molten salt to recover the desired, purified composition.

The invention will be described as applied to one preferred adaptation in which a molten salt composition comprising tri- and dichlorides of titanium dissolved in sodium chloride is purified prior to use of the composition in titanium metal production. Compositions of this type can be variously prepared, such as through reduction of titanium tetrachloride with hydrogen followed by dissolution of the subchlorides in molten sodium chloride; by reducing titanium tetrachloride to the desired subchloride state by means of sodium metal with a molten salts mixture of titanium subchloride and sodium chloride resulting; by subjecting titanium metal or titanium alloys to anodic oxidation in an electrolytic cell and wherein sodium chloride is utilized as an electrolyte, the anolyte or cell compositions comprising titanium subchloride dissolved in sodium chloride; by reacting titanium tetrachloride at elevated temperatures with titanium or titanium alloys and dissolving the subchlorides in sodium chloride, and by other known methods. In such preparation, impurities enter into the composition from the reactants used or inadvertently into the reactor apparatus. Thus, the titanium tetrachloride used may contain undesired oxygen and nitrogen contaminants; the sodium metal may contain oxygen and heavy metal (iron, copper, etc.) impurities; the titanium alloy may also contain these impurities, and titanium metal scrap employed can be contaminated with atmospheric impurities and such heavy metals.

In consequence, the molten salt composition will contain objectionable concentrations of these impurities, both in soluble and insoluble state dispersed throughout the solution. Their presence during the subsequent reduction step results in production of an impure type of unsatisfactory titanium or other metal product.

It has been found that if one reduces the average valence of the titanium or other fourth group metal present in the subhalide salt composition, advantageously, objectionable impurities present become converted to a more insoluble condition and can then be readily removed therefrom through filtering or settling. Thus, when the average valance of the titanium present in the composition is at, say, about 2.9, ferrous chloride remains quite soluble in the salt, but as such valence is reduced, say to between about 2.7 and 2.5, the solubility of the ferrous chloride decreases. The increasing activity of the divalent titanium content then will be sufficient to reduce the iron to the metallic state to enable ready removal thereof by conventional settling and/or filtration. This same condition prevails with respect to oxygen, iron, copper, etc. contaminants. For example, when the molten trivalent containing titanium salt is contaminated with oxygen, a definite solution of oxygen occurs. As the trivalent titanium is reduced to the divalent state, oxygen solubility will decrease to a point where its removal can be readily effected. Similarly, other impurities can be insolubilized and converted to removable condition by lowering the titanium valence to a level adapted to effect removal thereof to a condition of tolerable quantities.

Such impurity elimination can be accomplished in this invention by reducing the chlorine to titanium atomic ratio which prevails in the subchloride salt which is to be used in the reduction. Thus, the salt, in molten form, can be reacted within a closed vessel at temperatures ranging from about 700–850° C. with a suitable quantity and type of reducing agent, preferably sodium or magnesium metal, until the average titanium valence of the salt drops to a value at which insolubilization of the particular contaminant or impurities for removal takes place. For example, with a molten salt composition containing titanium subchlorides having a chlorine to titanium ratio or titanium average valence of about 2.9, the nitrogen impurity is relatively insoluble and can be removed by filtration. Carbon and silicon contaminants behave similar to nitrogen. Should the molten salt contain soluble iron, copper and oxygen impurities, reduction of the titanium average valence to between about 2.7 and 2.5 renders possible filtering out of insolubilized iron and copper impurities, and leaves oxygen-containing impurities in solution. A further reduction of such average to between about 2.2 and 2.0 will insolubilize such oxygen impurities so that they can be removed by filtration.

To a clearer understanding of the invention the following specific examples are given. These are only illustrative and are not to be construed as in limitation of the underlying principles and scope of the invention.

*Example I*

A molten salt composition comprising a mixture of titanium tri- and dichlorides and sodium chloride, and analyzing 19.18% titanium, 16.35% sodium, 64.38% chlorine was obtained by reacting the required amounts of sodium and titanium tetrachloride at an elevated temperature in a closed cooled-wall reactor in the presence of the molten salt. The chlorine to titanium atomic ratio of the molten subchloride composition obtained was about 2.7. Its impurity content based on the titanium present in the salt was .11 wt. percent iron, .09 wt. percent oxygen and .05 wt. percent nitrogen.

A 65 pound batch of this molten salt was reacted within a closed conventional type reactor under an inert atmosphere at 800–900° C. with 8.9 lbs. of molten magnesium metal, held in unagitated state, to produce titanium metal sponge. This sponge product was vacuum distilled and the metal product broken up and arc melted into an ingot to obtain a product with the hardness and impurity values given under A in the table below.

Another 65 pound batch of the impurity contaminated molten salt was transferred to a conventional reaction vessel disposed within a suitable furnacing means and in which 6 lbs. of titanium metal sponge chips had been previously placed. The salt composition was held at about 750° C. to 800° C. for about 2 hours in this vessel. This resulted in a reduction of the average valence of its titanium content to that when in contact with titanium metal, or until a chlorine to titanium atomic ratio of about 2.16 existed. It was then transferred while maintained in molten state into a columnar vessel containing fine chips of titanium metal resting on a 5 micron pore size stainless steel filter and wherein removal was effected of insolubilized oxygen, iron and nitrogen impurities present. The filtered molten salt product obtained was then reduced to titanium metal by reaction with magnesium in the same manner as described above in connection with the untreated salt composition batch. The resulting metal product was similarly treated to produce a titanium ingot, the hardness value and impurity content of which is shown in B of the table below.

The physical properties of these two titanium metal products were:

| Titanium Metal | BHN* | Percent Iron | Percent Oxygen | Percent Nitrogen |
| --- | --- | --- | --- | --- |
| A. Untreated | 190 | .14 | .183 | .059 |
| B. Treated | 115 | .03 | .094 | .009 |

*Brinell Hardness Number—Determined in accordance with procedures described pp. 189–196, Principles of Metallographic Laboratory Practice (1943), by G. M. Kehl (McGraw-Hill Pub. Co.).

*Example II*

A molten salt composition comprising a mixture of the titanium subchlorides $TiCl_3$ and $TiCl_2$ with sodium chloride, analyzing 21.04% titanium, 14.98% sodium, 63.15% chlorine, was obtained as in Example I by reacting the required amounts of titanium tetrachloride with sodium. The chlorine to titanium atomic ratio of the subchloride composition was about 2.6. Its impurity content was .06 wt. percent $O_2$, .07 wt. percent $N_2$, and .27 wt. percent Fe, based on the titanium content of the salt.

One batch, 65 lbs. in weight of this untreated salt was reduced in a closed reactor equipped with paddle type reactant agitating means to obtain particulate titanium metal. This was accomplished by reacting the salt with 8.75 lbs. of magnesium metal in the form of pellets of from 16 to 30 mesh size. The pellets were fed gradually to the molten salt while held at temperatures between about 675–725° C. in the reactor with accompanying agitation being resorted to in order to immerse and disperse the Mg pellets in the salt. The metal product obtained was then transferred to a conventional type vacuum purification furnace wherein most of the by-product salt was removed by draining, the remainder being then distilled off under vacuum at about 1000° C. to provide the untreated metal product A having the properties shown in the table below.

Another 65 lb. batch of the original salt composition was transferred to a particulate reactor similar to that used in the reduction just described. About 30% or 2.9 lbs. of the magnesium pellets were then added to effect a preliminary reduction of the titanium content of of the salt by maintaining the reactor under a temperature of 700–800° C. over a period of 2 hours. This magnesium addition and reaction reduced the chlorine to titanium atomic ratio of the titanium subchloride from about 2.6 to about 2.1. The resulting reaction mass was then charged into an associated retaining vessel, through a conduit containing 3 lbs. of titanium metal sponge to insure contact with metal and then to a 5 micron stainless steel filter. From the latter it was passed into a particulate reactor wherein the remaining 4¼ lbs. of magnesium pellets of 16–30 mesh size were gradually added to effect complete reduction of the purified subchloride molten salt composition under the same conditions as encountered in reducing the initial or untreated 65 pound batch. The resulting titanium metal product was separated from reaction by-product in the same manner as the product from said initial batch to obtain the titanium metal product, B, below.

Samples of each of the metal products from this example were arc melted into buttons, tested for Brinell-hardness, and were found on analysis for impurity content to exhibit the following characteristics:

| Titanium Metal | BHN | Percent Iron | Percent Oxygen | Percent Nitrogen |
| --- | --- | --- | --- | --- |
| A. Untreated | 278 | .31 | .149 | .083 |
| B. Treated | 110 | .04 | .084 | .016 |

*Example III*

A molten subchloride salt composition comprising a mixture of titanium chlorides and sodium chloride having an average titanium valence of 2.67, and analyzing 64.8% $TiCl_{2.67}$ and 35.2% NaCl, was prepared by conventionally reducing titanium tetrachloride with sodium. This composition contained .5 wt. percent $O_2$, .006 wt. percent $N_2$, and .15 wt. percent Fe as impurities, based on its titanium content.

A 77 lb. batch of this molten salt was reduced with about 22 lbs. of sodium metal in a closed reaction vessel, maintained at a temperature between about 750–850° C. The reduction product was first partially purified by draining therefrom a major portion of the NaCl by-product and then vacuum distilled to obtain the sponge metal product. A sample of this sponge was arc melted into a button exhibiting the characteristics shown by untreated product A of the table below.

Another 77 lb. batch of the molten salt composition was transferred to an externally heated reduction reactor and about 25% (5 lbs.) of the Na required to reduce its Ti subchlorides content to Ti metal was added. Reduction was then effected at a temperature of 800° C. This resulted in a reduction of the chlorine to titanium atomic ratio of the composition from 2.67 to about 2.0. The reduced reaction mass was then passed through a conduit containing a 5 micron stainless steel filter to remove impurities insolubilized in the preliminary reduction operation. The purified, molten salt obtained was then fed into a conventional reduction reactor, maintained at a temperature ranging from 750° C. to 850° C., wherein it was reacted with the remaining 16 lbs. of sodium required to effect its complete reduction to titanium metal. This metal product was then vacuum distilled and arc melted to provide a product having the properties and analysis shown by treated product B in the table below.

| Titanium Metal | BHN | Percent Iron | Percent Oxygen | Percent Nitrogen |
|---|---|---|---|---|
| A. Untreated | 288 | .19 | .61 | .013 |
| B. Treated | 135 | .04 | .121 | .007 |

In the above examples, contamination of the treated metal products which occurs reflects the amount of impurity which the products pick up during the reduction to metal and by-product removal steps, or as a result of variation in the handling conditions.

Although described in its application to the refining of chlorotitanite salt compositions found to be especially useful as intermediates in titanium metal production, and from which objectionable impurity contaminants are removed after conversion of some or all of the trivalent titanium salt to the divalent state, the invention is obviously not restricted thereto. It has general application to the purification of molten salt compositions containing subhalides, especially the chlorides of a metal from group IV–A of the periodic table (including titanium zirconium and hafnium), with a halide, especially a chloride of at least one metal selected from the group consisting of an alkali (sodium, potassium, lithium) and alkaline earth (magnesium, calcium, barium, strontium) metal or mixtures thereof. Examples of contemplated group IV–A metal salts or mixtures include titanium dichloride, titanium trichloride, zirconium dichloride, zirconium trichloride, hafnium dichloride, and hafnium trichloride, etc.

Similarly, while sodium and magnesium metal comprise preferred forms of useful reducing agents in the invention, other types and amounts of these agents can be used. In general, use is contemplated of any reducing agent which will effect a reduction of the group IV–A metal subhalide in the salt composition and convert the metallic and non-metallic impurities present to an insoluble state whereby removal of such impurities can be effected, as filtration or by known settling and filtration, or by various other solids separation means.

Examples of utilizable reducing agents include titanium metal, in sponge or other form; titanium alloys, crude or scrap; sodium, hydrogen, or the alkaline earth metals mentioned, etc. Titanium metal reacts with molten salt compositions containing titanium subchlorides having a chlorine to titanium atomic ratio greater than about 2.0 (a value dependent somewhat upon temperature of contacting). Therefore, the use of scrap, off-grade titanium metal, or titanium alloys is regarded favorably for use in the initial reduction step. During the reduction, the base metal impurities are reduced to or remain in the metallic state and are therefore insoluble in the titanium subchloride molten salt. The purpose of this step is to establish a molten salt solution which is stable with respect to titanium metal. It has been found that impurities in an impure salt have a tendency to be concentrated in the first titanium product in a batch reaction. This means that the impurities are removed from the salt as the initial titanium is produced. The reduction state of the purified salt is then that obtained when in contact with titanium metal.

A useful method of insuring adequate reduction is to have present in contact with the titanium subchloride molten salt composition a small amount of titanium metal which may also act in a gettering manner. Although the gettering action of the titanium metal is not completely understood, it is thought that by absorption or adsorption some of the impurities, especially the residual atmospheric type of impurity are removed from solution in the molten salt. By these means the titanium subchloride molten salt solution is treated to precipitate or insolubilize the impurities as solids which are either sludged out or dispersed therein.

The remaining step in the process is the separation of the purified molten salt solution from the insoluble impurities. As noted, known means of separating a solid from a liquid may be utilized in this final step, that is sedimentation, filtration, centrifuging, etc.

It is contemplated that the invention can be operated either as a batch system or continuously wherein flowing effective contact with treating agents and solids removal are utilized.

As already noted, lowering the titanium valence of the salt to between 2.7 and 2.5 permits iron and copper impurity removal. A further drop to between about 2.2 and 2.0 insolubilizes oxygen present and enables one to effect its removal. At this later stage the insolubilized oxygen containing impurity is high in titanium value and some titanium may be produced either by reduction or disproportionation of the titanium subchloride. This variation in the process can be used to remove iron from the salt solution when it is contaminated by this impurity alone by merely reducing the titanium to within such 2.7 to 2.5 range and then separating the purified salt from the insolubilized, precipitated impurity. Removal of certain impurities through less drastic reduction will be found useful in applications, e. g., dye stripping or leather treatment applications, where the oxygen impurity does not exist in objectionable amounts, but others, such as heavy metals, are objectionably present. Apparently, oxygen contamination requires the lowest reduction state treatment to obtain its insolubilization for removal.

While specific temperatures and times have been used above in reducing the metal subhalide to a state of lower valency, the invention is not restricted thereto. Salt compositions containing titanium subchlorides have melting points as low as about 450° C. but many of the reduction reactions are quite slow at these relatively low temperatures. Preferably, temperatures within the range of about 700 to 850° C. are used in such reduction step. The total range utilizable will be found to reside between the melting point of the particular molten salt composition under treatment and the temperature at which either the equipment used becomes attacked (to add additional undesired impurities to the salt) or a component of the salt exhibits excessive volatility. When the usual type of iron treating vessel is employed, a temperature of about 1000° C. comprises a useful upper limit.

Although specific titanium subchloride-sodium chloride compositions have been treated in the examples, it will be understood that in general treatment and refinement is contemplated of molten compositions containing various mixtures of a group IV–A metal subhalide with an alkali or alkaline earth metal halide. Subchlorides-chloride mixtures of these metals, especially those comprising titanium subchloride and sodium chloride contaminated with non-metallic or metallic impurities, are particularly adaptable and preferred for treatment herein. Other examples of salt compositions contemplated for treatment include mixtures of titanium, zirconium or hafnium subchlorides with potassium chloride, lithium chloride, etc.; titanium, zirconium, or hafnium subchlorides with calcium, barium, or strontium chlorides. Also contemplated for treatment are multi-component compositions such as binary mixtures of the solvent salt, such as sodium chloride-potassium chloride, with, for example, titanium, zirconium, hafnium, etc., subchlorides.

The concentration of the fourth group metal sub-halide present in the solvent is variable. Thus, in the case of titanium subchlorides, a 20% amount is usually preferred. However, relatively dilute subhalide salt concentrations, say to as low as 5% or relatively concentrated amounts, up to, say, the limit of solubility of such salt in the molten solvent alkali or alkaline earth metal halide present can be used.

Advantageously, the invention provides an effective method for avoiding titanium and other group IV–A metal contamination by the so-called interstitial elements, oxygen, nitrogen and carbon which harden the metal but at a prohibitive loss of ductility at high strength levels. It provides purified molten salt compositions useful as a reactant to produce relatively pure group IV—A metal or alloys thereof through well-known reduction techniques at elevated temperatures (850–1050° C.) in a closed reaction vessel with a reducing metal such as magnesium. They are especially useful for preparing from such reductions pure titanium metal and pure titanium alloys, or as a chemical reactant for the preparation of other desired titanium compounds wherein purity of reactants is desirable or essential.

We claim as our invention:

1. A method for purifying a molten impurity-contaminated salt composition comprising a subchloride of a group IV–A metal selected from the group consisting of titanium, zirconium and hafnium and a chloride of a metal selected from the group consisting of alkali and alkaline earth metals, which comprises adjusting the average valence of the group IV–A metal present in said composition through reaction with a reducing agent to a value ranging from 2.0 to 2.9 to insolubilize soluble impurities present therein, effecting said reaction at a temperature between the melting point and below the volatilization temperature of said composition, and then removing the insolubilized material from the composition.

2. A method for purifying a molten impurity-contaminated salt composition containing a titanium subchloride and a chloride of a metal selected from the group consisting of alkali and alkaline earth metals, which comprises reducing by reaction with a reducing agent the average valence of the titanium present to a value ranging from 2.0 to 2.9, effecting said reaction at a temperature between the melting point and below the volatilization temperature of said composition, and removing insolubilized metal and non-metallic impurity material which forms therein during said reduction to recover the purified salt.

3. A method for purifying a molten impurity-contaminated salt composition containing a zirconium subchloride and a chloride of a metal selected from the group consisting of alkali and alkaline earth metals, which comprises reducing by reaction with a reducing agent the average valence of the zirconium present to a value ranging from 2.0 to 2.9, effecting said reaction at a temperature between the melting point and below the volatilization temperature of said composition, and removing the insoluble metal and non-metallic impurity material formed therein during said reduction to recover the purified salt.

4. A method for purifying a molten impurity-contaminated salt composition containing a hafnium subchloride and a chloride of a metal selected from the group consisting of alkali and alkaline earth metals, which comprises reducing by reaction with a reducing agent the average valence of the hafnium present to a value ranging from 2.0 to 2.9, effecting said reaction at a temperature between the melting point and below the volatilization temperature of said composition, and removing the insoluble metal and non-metallic impurity material formed to recover the purified salt.

5. A process for purifying a molten salt composition mixture of an alkali metal chloride with titanium subchlorides containing dissolved metal and non-metal impurities, comprising reducing by reaction with a reducing metal and at a 700–1000° C. temperature the atomic ratio of chlorine to titanium in said titanium subchlorides present in said composition to a value ranging from 2.0 to 2.9 and where said dissolved impurities present are rendered insoluble, and separating the insolubilized impurities from the salt composition to recover the salt in purified state.

6. A process for removing soluble contaminants from a molten salt mixture comprising a subchloride of a metal from group IV–A of the periodic table selected from the group consisting of titanium, zirconium and hafnium and at least one halide of a metal selected from the group consisting of alkali and alkaline earth metals, which comprises reducing by reaction with a reducing agent at a temperature of from 700–1000° C. the atomic ratio of halogen to the fourth group metal in said subhalide to within a range of about 2.0 to 2.7 to convert the metal and non-metallic contaminants present to insoluble form, and removing the insoluble contaminants formed during said reduction from the resulting composition.

7. A process for removing soluble contaminants from a molten salt mixture comprising a subchloride of a metal selected from group IV–A of the periodic table selected from the group consisting of titanium, zirconium and hafnium and at least one chloride of a mixture selected from the group consisting of alkali and alkaline earth metals, which comprises reducing by reaction with a reducing metal at temperatures ranging from 700–850° C. the atomic ratio of chlorine to the fourth group metal present in said subchloride to within a range of about 2.0 to 2.7 to convert soluble metal and non-metallic contaminants present to insoluble form, and thereafter removing the insolubilized contaminants formed as a result of said reduction from said salt mixture to recover the latter in purified state.

8. A process for removing soluble contaminants from a molten salt mixture comprising a subchloride of titanium and sodium chloride, which comprises reducing by reaction with a reducing metal the atomic ratio of chlorine to titanium in said subchloride to within a range of about 2.0 to 2.7 to convert soluble metal and non-metallic contaminants present to insoluble state, and then removing from the mixture the insolubilized contaminants formed during said reduction operation.

9. A process for purifying an impure molten salt solution of titanium subchlorides with an alkali metal chloride which comprises reacting said titanium subchloride in said molten salt at temperatures ranging from 700–1000° C. with a reducing agent until the atomic ratio of chlorine to titanium ranges from 2.0 to 2.7 and soluble metallic and non-metallic impurities present are converted to the solid state in said molten salt and precipitate therein, and then physically separating the insoluble material from the salt and recovering the latter in purified condition.

10. A process for purifying a molten salt mixture comprising sodium chloride and titanium subchlorides, which comprises reducing the average valence of the titanium present in said salt within a range of about 2.2 to 2.0 by reacting at an elevated temperature of from 700–850° C. the subchlorides present in said mixture with a reducing agent to precipitate soluble oxygen and nitrogen impurities present therein, and then physically separating the insolubilized precipitated material from said molten salt to recover the latter in purified state.

11. A process for purifying an impurity-contaminated molten salt solution containing a mixture of sodium chloride with titanium di- and tri-chlorides comprising adjusting through reaction with a reducing metal at temperatures of from 700–1000° C. the average valence of the titanium in the molten salt to provide a chlorine to titanium ratio of from 2.0 to 2.7 to insolubilize and precipitate metallic and non-metallic contaminants present, and physically removing the insolubilized material from the said molten salt.

12. A method of removing solubilized atmospheric and metal derived impurities from a molten salt composition comprising titanium subchlorides dissolved in at least one molten salt selected from the class consisting of alkali and alkaline earth metal chlorides, which comprises chemically reducing the chlorine to titanium atomic ratio of the titanium subchlorides present to within a range of 2.2 to 2.0 and insolubilizing soluble oxygen and nitrogen impurities by contacting and reacting said composition at an elevated temperature of from 700–850° C. with titanium metal, separating the insolubilized contaminants from said salt by physical means to recover the purified titanium subchloride molten salt composition.

References Cited in the file of this patent

UNITED STATES PATENTS

| | | |
|---|---|---|
| 2,607,674 | Winter | Aug. 19, 1952 |
| 2,618,550 | Hampel et al. | Nov. 18, 1952 |
| 2,631,941 | Cole | Mar. 17, 1953 |
| 2,647,826 | Jordan | Aug. 4, 1953 |
| 2,703,752 | Glasser et al. | Mar. 8, 1955 |
| 2,706,153 | Glasser | Apr. 12, 1955 |
| 2,758,019 | Daubenspeck et al. | Aug. 7, 1956 |

FOREIGN PATENTS

| | | |
|---|---|---|
| 694,921 | Great Britain | July 29, 1953 |